United States Patent
Glanzer et al.

(10) Patent No.: US 12,312,752 B2
(45) Date of Patent: May 27, 2025

(54) PLATE COMPACTOR

(71) Applicant: MILWAUKEE ELECTRIC TOOL CORPORATION, Brookfield, WI (US)

(72) Inventors: Evan M. Glanzer, Milwaukee, WI (US); John E. Koller, Brookfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 772 days.

(21) Appl. No.: 17/369,502

(22) Filed: Jul. 7, 2021

(65) Prior Publication Data

US 2022/0010505 A1 Jan. 13, 2022

Related U.S. Application Data

(60) Provisional application No. 63/059,251, filed on Jul. 31, 2020, provisional application No. 63/048,722, filed on Jul. 7, 2020.

(51) Int. Cl.
| | |
|---|---|
| *E01C 19/38* | (2006.01) |
| *E02D 3/074* | (2006.01) |
| *H02K 1/278* | (2022.01) |
| *H02K 7/06* | (2006.01) |
| *H02K 7/14* | (2006.01) |

(52) U.S. Cl.
CPC .............. *E01C 19/38* (2013.01); *E02D 3/074* (2013.01); *H02K 1/278* (2013.01); *H02K 7/061* (2013.01); *H02K 7/063* (2013.01); *H02K 7/14* (2013.01)

(58) Field of Classification Search
CPC ......... E01C 19/38; E02D 3/074; H02K 1/278; H02K 7/061; H02K 7/063; H02K 7/14
USPC ................................. 404/113, 133.05–133.2
See application file for complete search history.

(56) References Cited

U.S. PATENT DOCUMENTS

| | | |
|---|---|---|
| 3,306,174 A | 2/1967 | Wardell |
| 3,530,577 A | 9/1970 | Franklin et al. |
| 3,543,655 A | 12/1970 | Uebel |
| 3,759,624 A | 9/1973 | Hundey et al. |
| 3,802,791 A | 4/1974 | Uebel et al. |
| 3,832,080 A | 8/1974 | Stoecker |
| 3,883,260 A | 5/1975 | Heckner |
| 3,917,426 A | 11/1975 | Wohlwend et al. |
| 3,972,637 A | 8/1976 | Sutherland |
| 4,113,403 A | 9/1978 | Tertinek et al. |

(Continued)

FOREIGN PATENT DOCUMENTS

| | | |
|---|---|---|
| CN | 2127721 Y | 3/1993 |
| CN | 2267271 Y | 11/1997 |

(Continued)

OTHER PUBLICATIONS

International Search Report and Written Opinion for Application No. PCT/US2021/040675 dated Oct. 27, 2021 (12 pages).

(Continued)

*Primary Examiner* — Raymond W Addie
(74) *Attorney, Agent, or Firm* — Michael Best & Friedrich LLP

(57) ABSTRACT

A compactor includes a plate and an electric motor coupled to the plate and configured to impart vibration thereto. The electric motor including a stator and a rotor defining a rotational axis and having a center of mass that is not intersected by the rotational axis.

10 Claims, 5 Drawing Sheets

(56) References Cited

U.S. PATENT DOCUMENTS

| | | | |
|---|---|---|---|
| 4,145,156 A | 3/1979 | Grane | |
| 4,199,271 A | 4/1980 | Riedl | |
| 4,356,736 A | 11/1982 | Riedl | |
| 4,775,263 A | 10/1988 | Persson | |
| 4,838,730 A | 6/1989 | Owens | |
| 5,397,951 A * | 3/1995 | Uchida | H02K 1/278 310/91 |
| 5,632,569 A | 5/1997 | Szmansky | |
| 5,672,027 A | 9/1997 | Wadensten | |
| 5,890,834 A | 4/1999 | Waldenberger | |
| 5,957,622 A | 9/1999 | Vera-Montiel | |
| 6,213,673 B1 | 4/2001 | Jungwirth et al. | |
| 6,213,681 B1 | 4/2001 | Sick et al. | |
| 6,374,569 B1 | 4/2002 | Suckow | |
| 6,379,082 B1 | 4/2002 | Takemoto | |
| 6,394,697 B1 | 5/2002 | De Boer | |
| 6,435,767 B1 | 8/2002 | Steffen | |
| 6,558,073 B1 | 5/2003 | Wrazidlo | |
| 6,582,155 B1 | 6/2003 | Bromberger et al. | |
| 6,659,685 B1 | 12/2003 | Persson | |
| 6,722,815 B2 | 4/2004 | Fervers | |
| 6,794,632 B1 | 9/2004 | Steffen | |
| 6,808,336 B2 | 10/2004 | Fervers et al. | |
| 6,846,128 B2 | 1/2005 | Sick | |
| 6,923,595 B1 | 8/2005 | Chek | |
| 6,953,304 B2 | 10/2005 | Quenzi et al. | |
| 7,052,204 B2 | 5/2006 | Lutz | |
| 7,097,384 B2 | 8/2006 | Lindley | |
| 7,175,365 B1 | 2/2007 | Breeding | |
| 7,303,356 B2 | 12/2007 | Schennach et al. | |
| 7,427,176 B2 | 9/2008 | Persson et al. | |
| 7,465,121 B1 | 12/2008 | Hendricks et al. | |
| 7,491,014 B2 | 2/2009 | Sick | |
| 7,686,538 B2 | 3/2010 | Lutz et al. | |
| 7,753,621 B2 | 7/2010 | Steffen | |
| 7,988,383 B2 | 8/2011 | Hickmann | |
| 8,047,742 B2 | 11/2011 | Sick et al. | |
| 8,123,432 B1 | 2/2012 | Steffen | |
| 8,182,173 B2 | 5/2012 | Lickel | |
| 8,439,600 B2 | 5/2013 | Brening | |
| 8,602,680 B2 | 12/2013 | Fischer et al. | |
| 8,608,402 B2 | 12/2013 | Argento et al. | |
| 8,721,218 B2 | 5/2014 | Stenzel | |
| 9,010,452 B2 | 4/2015 | Williamson et al. | |
| 9,139,966 B1 | 9/2015 | Mikowychok | |
| 9,175,447 B2 | 11/2015 | Steffen | |
| 9,284,697 B2 | 3/2016 | Steffen | |
| 9,695,605 B2 | 7/2017 | Jin | |
| 9,879,389 B1 | 1/2018 | Lura | |
| 9,925,563 B2 | 3/2018 | Bartl et al. | |
| 10,184,217 B2 | 1/2019 | Mikowychok | |
| 10,265,730 B2 | 4/2019 | Johnsson et al. | |
| 10,344,439 B2 | 7/2019 | Steffen et al. | |
| 10,584,765 B2 * | 3/2020 | Six | H02K 16/00 |
| 2006/0067796 A1 | 3/2006 | Riedl | |
| 2006/0127190 A1 | 6/2006 | Kremer | |
| 2006/0272130 A1 | 12/2006 | Togami et al. | |
| 2008/0150380 A1 | 6/2008 | Hsiao et al. | |
| 2008/0298893 A1 | 12/2008 | Stenzel et al. | |
| 2010/0139424 A1 | 6/2010 | Wagner | |
| 2010/0166499 A1 | 7/2010 | Stenzel et al. | |
| 2010/0278590 A1 | 11/2010 | Stenzel | |
| 2012/0251241 A1 | 10/2012 | Sperfslage | |
| 2014/0262400 A1 | 9/2014 | Berger | |
| 2015/0159384 A1 | 6/2015 | Wetherell | |
| 2015/0376845 A1 | 12/2015 | Bartl | |
| 2016/0308420 A1 | 10/2016 | Harrison | |
| 2017/0022673 A1 | 1/2017 | Mckee | |
| 2017/0275831 A1 | 9/2017 | Sorg et al. | |
| 2019/0078282 A1 * | 3/2019 | Steffen | E01C 19/38 |
| 2020/0076337 A1 * | 3/2020 | Abbott | F16H 1/14 |
| 2021/0194316 A1 * | 6/2021 | Sprague | H02K 7/14 |

FOREIGN PATENT DOCUMENTS

| | | |
|---|---|---|
| CN | 2837369 Y | 11/2006 |
| CN | 201092652 Y | 7/2008 |
| CN | 100430554 C | 11/2008 |
| CN | 201146414 Y | 11/2008 |
| CN | 101671993 A | 3/2010 |
| CN | 101671996 A | 3/2010 |
| CN | 202164588 U | 3/2012 |
| CN | 202247634 U | 5/2012 |
| CN | 202500128 U | 10/2012 |
| CN | 202519568 U | 11/2012 |
| CN | 202519569 U | 11/2012 |
| CN | 203603137 U | 5/2014 |
| CN | 203834321 U | 9/2014 |
| CN | 203834322 U | 9/2014 |
| CN | 203834323 U | 9/2014 |
| CN | 204626211 U | 9/2014 |
| CN | 104674635 A | 6/2015 |
| CN | 204703042 U | 10/2015 |
| CN | 204728309 U | 10/2015 |
| CN | 204898642 U | 12/2015 |
| CN | 205636716 U | 10/2016 |
| CN | 106192977 A | 12/2016 |
| CN | 205839549 U | 12/2016 |
| CN | 106868990 A | 6/2017 |
| CN | 206298804 U | 7/2017 |
| CN | 206428562 U | 8/2017 |
| CN | 206428563 U | 8/2017 |
| CN | 107165030 A | 9/2017 |
| CN | 206570656 U | 10/2017 |
| CN | 107354933 A | 11/2017 |
| CN | 206843911 U | 1/2018 |
| CN | 207073052 U | 3/2018 |
| CN | 207244834 U | 4/2018 |
| CN | 207392011 U | 5/2018 |
| CN | 207392183 U | 5/2018 |
| CN | 207469046 U | 6/2018 |
| CN | 207484244 U | 6/2018 |
| CN | 207512557 U | 6/2018 |
| CN | 207608902 U | 7/2018 |
| DE | 1911878 A1 | 12/1970 |
| DE | 1634679 B1 | 1/1971 |
| DE | 1964318 A1 | 7/1971 |
| DE | 2155687 A1 | 5/1973 |
| DE | 2319947 A1 | 10/1974 |
| DE | 2336631 A1 | 2/1975 |
| DE | 7316290 U | 7/1976 |
| DE | 3230747 A1 | 2/1984 |
| DE | 8223313 U1 | 3/1984 |
| DE | 3040123 C2 | 4/1984 |
| DE | 3240626 C2 | 1/1985 |
| DE | 8513149 U1 | 1/1988 |
| DE | 9013243 U1 | 2/1991 |
| DE | 4016822 A1 | 11/1991 |
| DE | 9213315 U1 | 12/1992 |
| DE | 9418184 U1 | 1/1995 |
| DE | 29605664 U1 | 7/1996 |
| DE | 29804047 U1 | 6/1998 |
| DE | 29920177 U1 | 1/2000 |
| DE | 19840453 C2 | 9/2000 |
| DE | 19912813 C1 | 12/2000 |
| DE | 202004015141 U1 | 12/2004 |
| DE | 102007006209 A1 | 11/2007 |
| DE | 202009000264 U1 | 3/2009 |
| DE | 202009004301 U1 | 11/2009 |
| DE | 202009004302 U1 | 11/2009 |
| DE | 102010019053 A1 | 11/2011 |
| DE | 202007019293 U1 | 11/2011 |
| DE | 202010017338 U8 | 1/2013 |
| DE | 102007003927 B4 | 12/2013 |
| DE | 102008017058 B4 | 3/2017 |
| DE | 112016000636 T5 | 1/2018 |
| DE | 102016009029 A1 | 2/2018 |
| EP | 0200949 A2 | 11/1986 |
| EP | 0464939 A1 | 1/1992 |
| EP | 1267001 B1 | 9/2009 |
| EP | 2458089 A2 | 5/2012 |
| EP | 2357283 B1 | 6/2013 |

(56) References Cited

FOREIGN PATENT DOCUMENTS

| EP | 1980671 | B1 | | 11/2015 | | |
|----|---------|----|---|---------|---|---|
| EP | 2940213 | A1 | | 11/2015 | | |
| EP | 2947205 | A1 | | 11/2015 | | |
| EP | 3069798 | A1 | | 9/2016 | | |
| EP | 3085832 | A1 | | 10/2016 | | |
| EP | 2957486 | B1 | | 1/2018 | | |
| EP | 3851583 | A1 | | 7/2021 | | |
| EP | 3851583 | B1 | * | 12/2024 | ........... | E01C 19/286 |
| JP | 2000301066 | A1 | | 10/2000 | | |
| JP | 2002254029 | A | | 9/2002 | | |
| WO | WO1985002220 | A1 | | 5/1985 | | |
| WO | WO1999041461 | A1 | | 8/1999 | | |
| WO | WO2002070824 | A1 | | 9/2002 | | |
| WO | WO2008049542 | A1 | | 5/2008 | | |
| WO | 2009120046 | A2 | | 10/2009 | | |
| WO | WO2009121606 | A1 | | 10/2009 | | |
| WO | WO2010086669 | A1 | | 8/2010 | | |
| WO | WO2011157344 | A1 | | 12/2011 | | |
| WO | WO2012062384 | A2 | | 5/2012 | | |
| WO | WO2013137015 | A1 | | 9/2013 | | |
| WO | WO2018019408 | A1 | | 2/2018 | | |
| WO | WO2018068091 | A1 | | 4/2018 | | |
| WO | 2020201194 | A1 | | 10/2020 | | |

OTHER PUBLICATIONS

Extended European Search Report for Application No. 21837281.1 dated Aug. 7, 2024 (14 pages).

* cited by examiner

PLATE COMPACTOR

CROSS-REFERENCE TO RELATED APPLICATIONS

This application claims priority to U.S. Provisional Patent Application No. 63/059,251 filed on Jul. 31, 2020 and U.S. Provisional Patent Application No. 63/048,722 filed on Jul. 7, 2020, the entire contents of both of which are incorporated herein by reference.

FIELD OF THE INVENTION

The present invention relates to plate compactors.

BACKGROUND OF THE INVENTION

Plate compactors include a plate that is caused to vibrate in order to compact soil or other loose material.

SUMMARY OF THE INVENTION

The present invention provides, in one aspect, a compactor comprising a plate and an electric motor coupled to the plate and configured to impart vibration thereto. The electric motor including a stator and a rotor defining a rotational axis and having a center of mass that is not intersected by the rotational axis.

The present invention provides, in another aspect, an electric motor configured for use with a compactor. The electric motor comprises a motor housing, a stator disposed within the motor housing, and a rotor arranged within the stator and configured for rotation relative to the stator about a rotational axis. The rotor includes a plurality of surface-mounted permanent magnets and a plurality of bores arranged in an annular formation about the rotational axis. At least one, but not all, of the bores are filled with respective weights to collectively define an eccentric mass offset from the rotational axis.

The present invention provides, in yet another aspect, an electric motor configured for use with a plate compactor. The electric motor comprises a motor housing, a stator, a rotor configured for rotation relative to the stator about a rotational axis, the rotor including an axial plate and a plurality of permanent magnets, and an eccentric mass coupled to the axial plate for co-rotation with the rotor about the rotational axis.

The present invention provides, in a further aspect, an electric motor configured for use with a plate compactor. The electric motor comprises a rotor, a stator arranged within the rotor, and an eccentric mass coupled to an outer surface of the rotor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
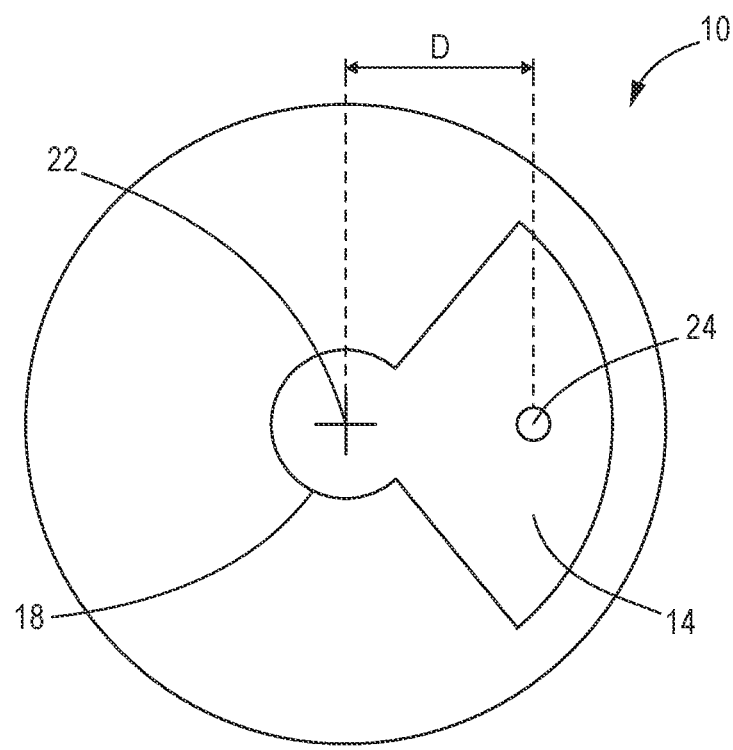
FIG. 1 is a schematic cross-sectional view of a typical vibration mechanism for use in a plate compactor.

As shown in FIG. 1, plate compactors, vibratory plates and vibratory rollers oftentimes include a vibration mechanism 10 to create vibration. The vibration mechanism 10 includes an eccentric mass 14 coupled to a shaft 18 defining a rotational axis 22. The eccentric mass 14 is offset from the rotational axis 22, such that a center of mass 24 of the vibration mechanism 10 is not intersected by the rotational axis 22. Thus, when the eccentric mass 14 is rotated with the shaft 18 about the rotational axis 22, the vibration mechanism 10 imparts vibration to the structure to which the vibration mechanism 10 is attached. The characteristics of the vibration can be changed by changing the mass of the eccentric mass 14 and/or a distance D that is defined between the rotational axis 22 and the center of mass 24. The vibration mechanism 10 is typically external to an electric motor or engine being used to rotate the shaft 18. Sometimes the shaft 18 is rotated by a pulley system, or the shaft 18 is an extension of a rotor of the electric motor.

Figure 2:
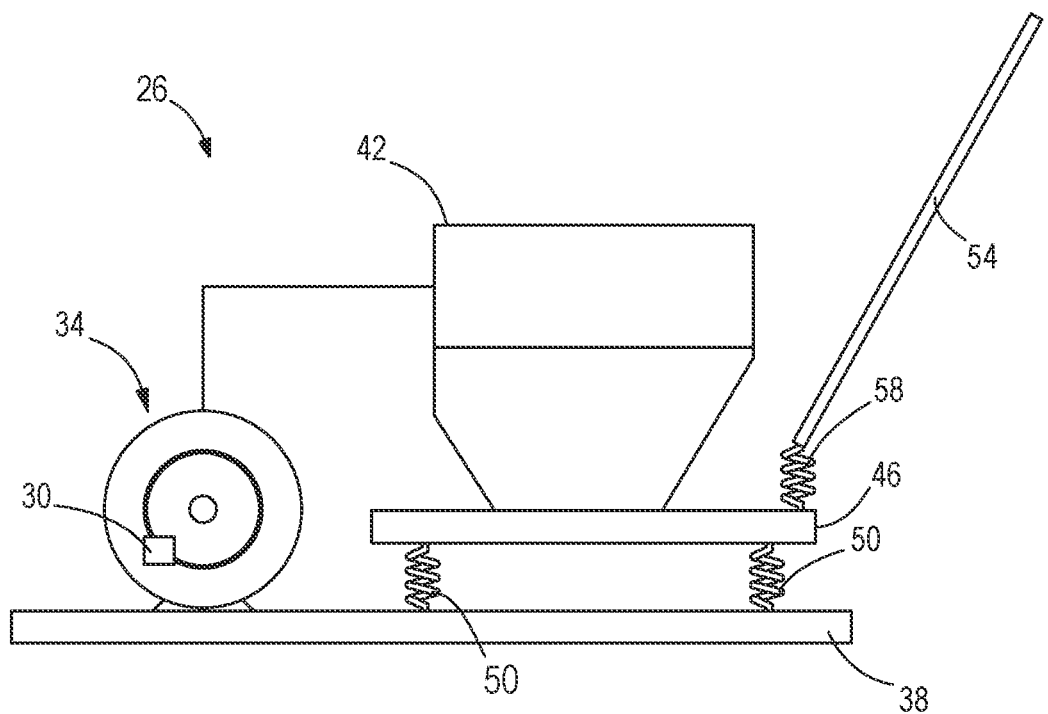
FIG. 2 is a schematic side view of a plate compactor according to an embodiment of the invention.
Figure 2A:
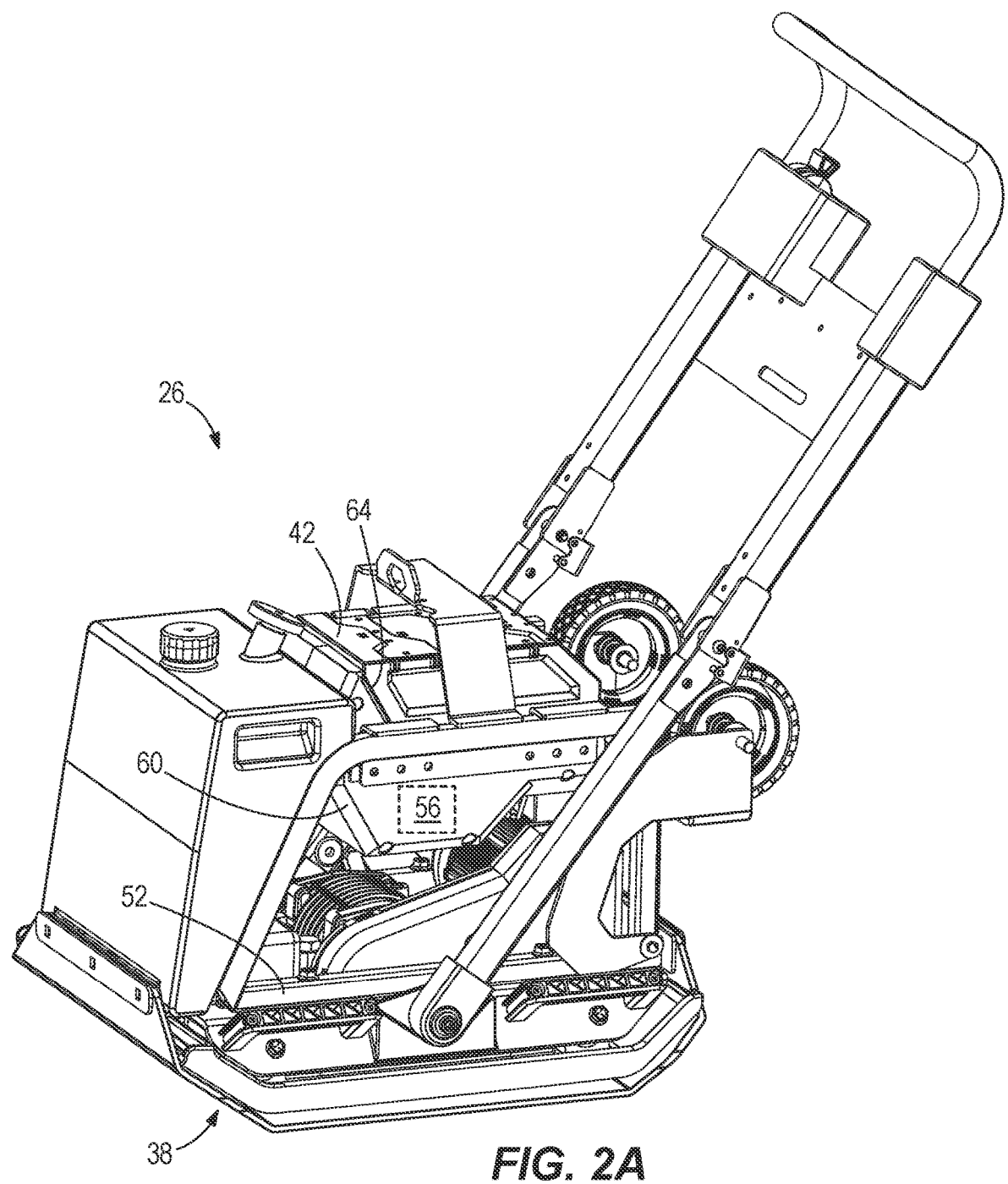
FIG. 2A is a perspective view of the plate compactor of FIG. 2 according to another embodiment of the invention.

In contrast, FIG. 2 illustrates a plate compactor 26 in which an eccentric mass 30 (shown schematically) is integrated with an electric motor 34 that is mounted on and configured to vibrate a plate 38. A battery 42 provides electrical power to the electric motor 34 and is arranged on a platform 46 that is vibrationally isolated from the electric motor 34 and the plate 38 via vibration isolators 50 or dampers. Although the plate 38 is schematically illustrated as a single body, the plate 38 may comprise a combination of rigidly connected components that facilitate sliding the compactor 42 across a work surface to be compacted. The plate compactor 26 also includes control electronics 56 to direct power to the electric motor 34 from the battery 42. In an embodiment in which the platform 46 is configured as a housing 60 defining thereon a battery receptacle 64 to which the battery 42 is connectable (FIG. 2A), the control electronics 56 may be located within the housing 60. Because the platform 46 is vibrationally isolated from the plate 38 by the vibration isolators 50, the control electronics 56 are also vibrationally isolated from the plate 38. In some embodiments, the compactor 26 may include an intermediate frame 52 interconnecting the housing 60 and the plate 38 (e.g., via additional vibrational isolators 50). A handle 54 for maneuvering the plate compactor 26 is coupled to the platform 46 via an additional vibration isolator 58 or damper. Alternatively, the handle 54 may instead be coupled to the plate 38. The electric motor 34 including the eccentric mass 30 can be implemented in various ways, three of which are described in detail below.

Figure 3:
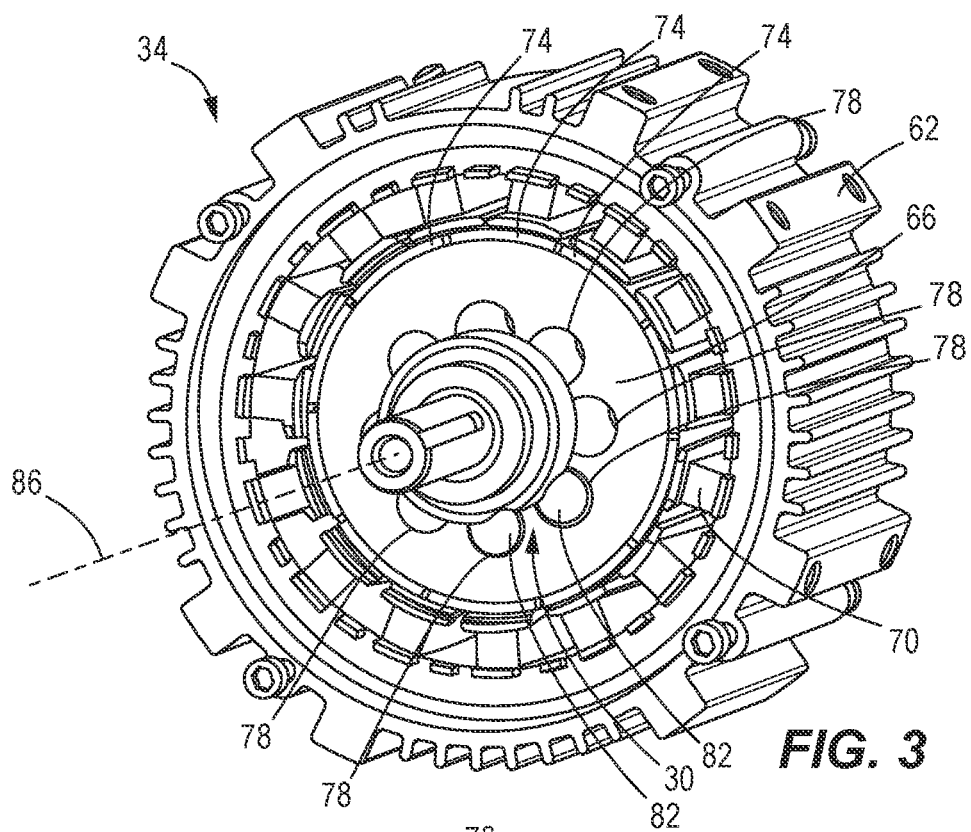
FIG. 3 is a perspective view of a motor of the plate compactor of FIG. 2, with portions removed, according to an embodiment of the invention.
Figure 4:
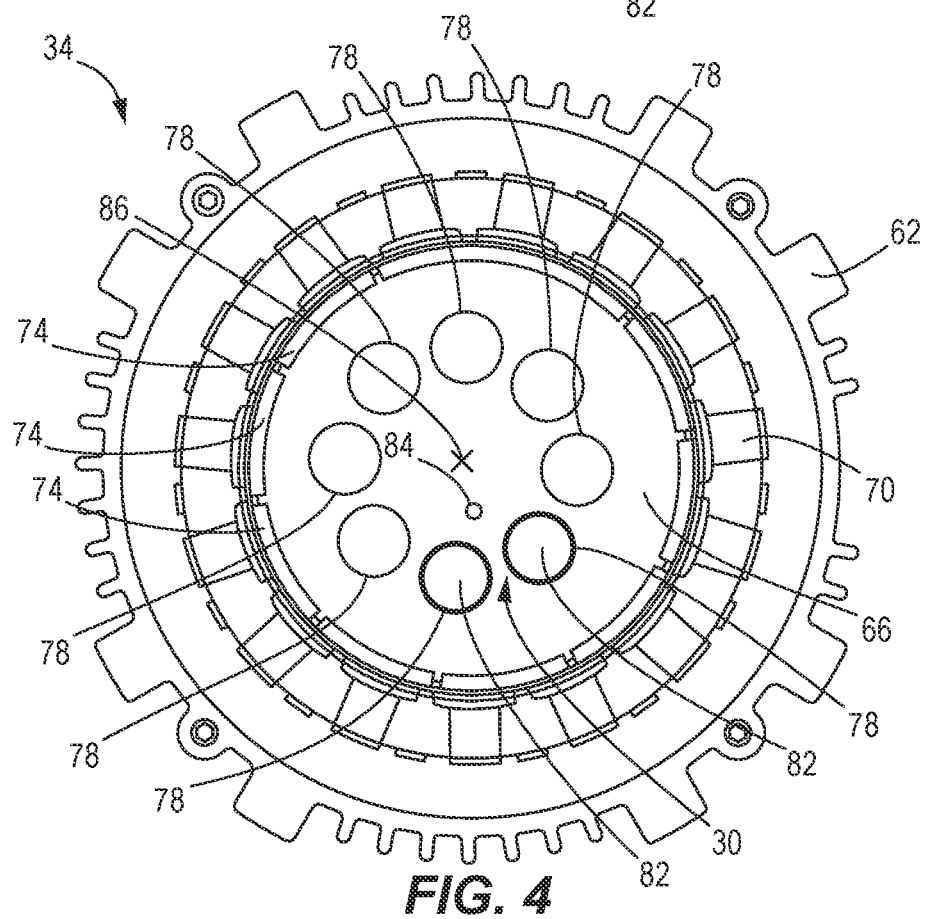
FIG. 4 is a cross-sectional view of the motor of FIG. 3.

In an embodiment shown FIGS. 3 and 4, the electric motor 34 is a brushless DC motor including a motor housing 62, a stator 70 within the motor housing 62, and a rotor 66 arranged within the stator 70 and including a plurality of surface-mounted permanent magnets 74. The rotor 66 also includes a plurality of bores 78 arranged in an annular formation in the rotor 66. The bores 78 could also be formed in brushless DC motors with internal permanent magnets and AC induction motors. At least one, but not all, of the bores 78 are filled with individual weights 82 to collectively form the eccentric mass 30, such that a center of mass 84 (FIG. 4) of the rotor 66 is not intersected by a rotational axis 86 defined by the rotor 66. Thus, when the rotor 66 rotates relative to the stator 70, the rotor 66 imparts vibration to the plate 38.

Figure 5:
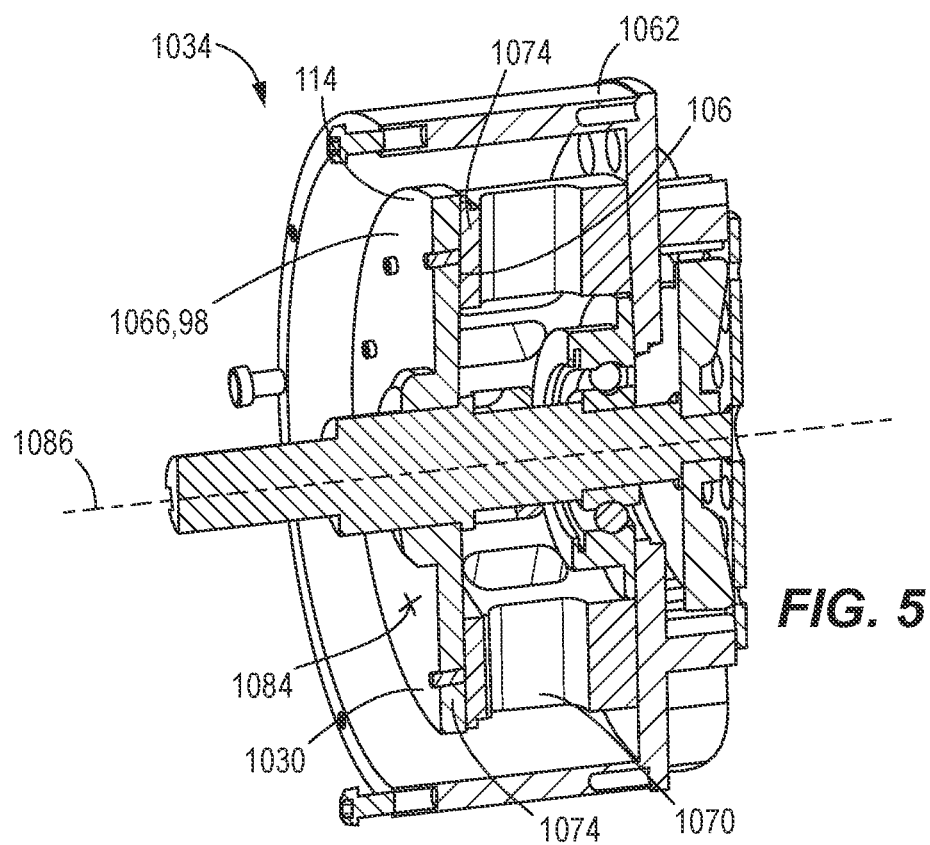
FIG. 5 is a cross-sectional view of a motor of the plate compactor of FIG. 2, according to an embodiment of the invention.

FIG. 5 illustrates another embodiment of an electric motor 1034 for use with the plate compactor 26, with like features as the electric motor 34 shown with like reference numerals plus "1000." The electric motor 1034 is an axial flux motor including a motor housing 1062 and a rotor 1066 having an axial plate 98 and a plurality of permanent magnets 1074 coupled to a first side 106 of the axial plate 98 that is in facing relationship with a stator 1070. The eccentric mass 1030 is coupled to a second side 114 of the axial plate 98 that is opposite the first side 106 of the axial plate 98. The eccentric mass 1030 is offset from a rotational axis 1086 defined by the rotor 1066, such that a center of mass 1084 of the rotor 1066 is not intersected by the rotational axis 1086. When the rotor 1066 rotates relative to a stator 1070, the rotor 1066 vibrates in a direction that is perpendicular to the rotational axis 1086, thus imparting vibration to the plate 38. The motor housing 1062 and direction of vibration of the rotor 1066 makes the motor 1034 less susceptible to "stack rub", which occurs when the first side 106 of the axial plate 98 of the rotor 1066 or the permanent magnets 1074 rub against the stator 1070.

Figure 6:
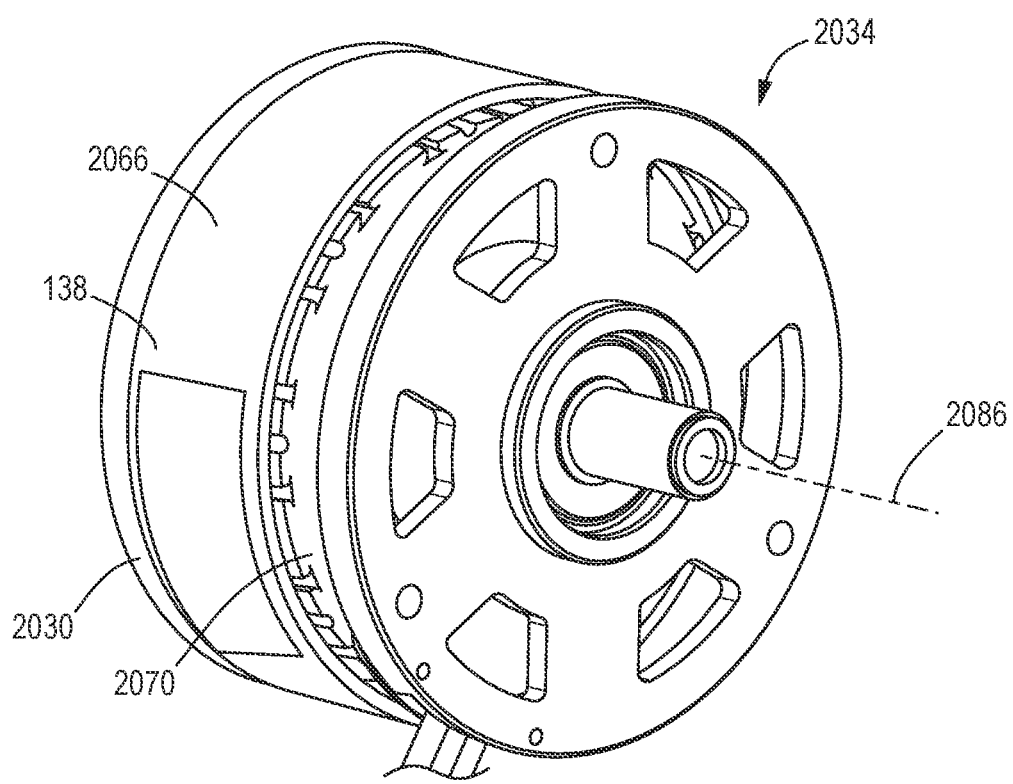
FIG. 6 is a perspective view of a motor of the plate compactor of FIG. 2, according to an embodiment of the invention.
Figure 7:
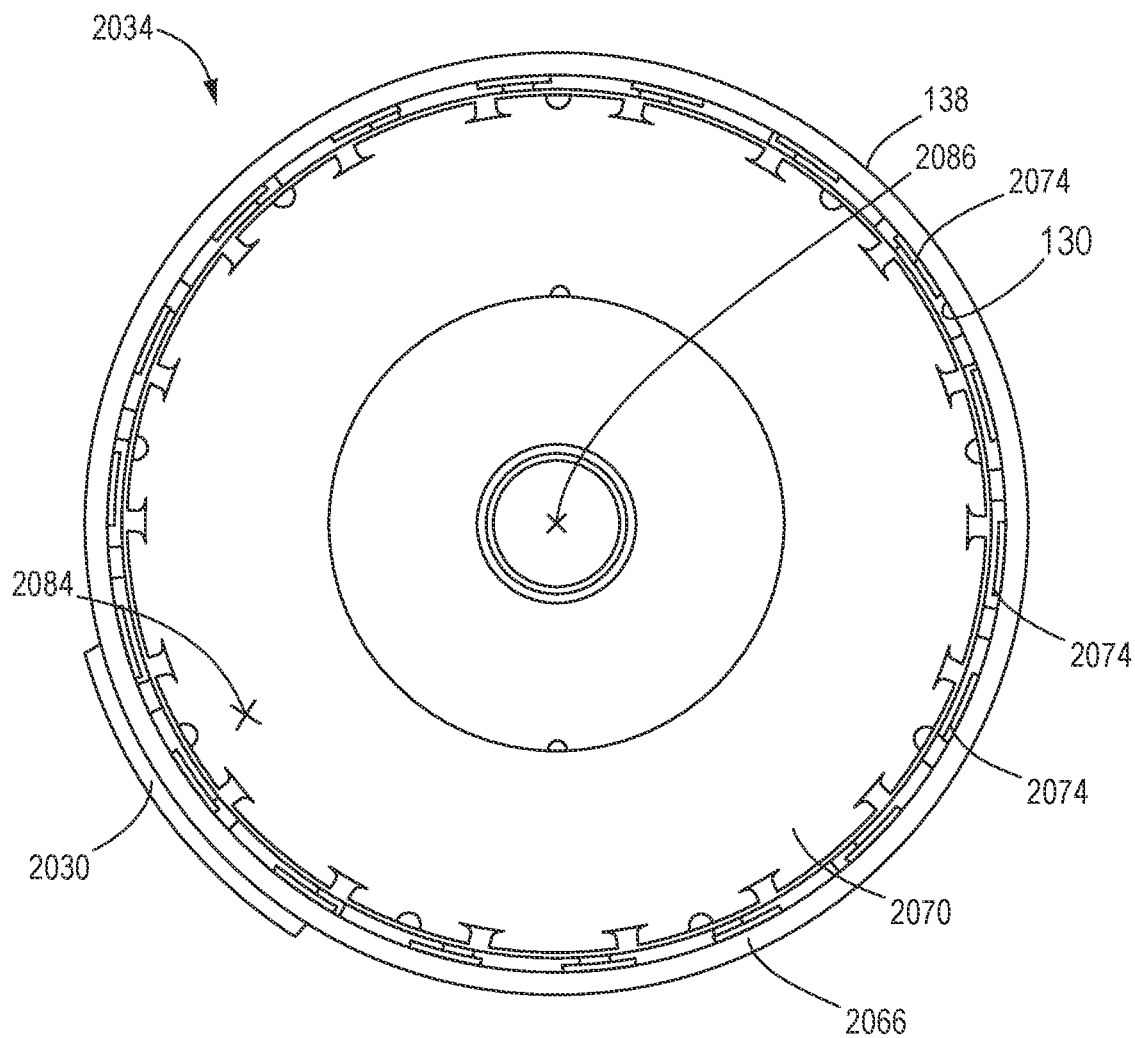
FIG. 7 is a cross-sectional view of the motor of FIG. 6.

FIGS. 6 and 7 illustrate another embodiment of an electric motor 2034 for use with the plate compactor 26, with like features as the electric motor 34 shown with like reference numerals plus "2000." The motor 2034 is an outer-rotor motor including a rotor 2066 arranged outside a stator 2070. The rotor 2066 includes an inner surface 130 on which a plurality of permanent magnets 2074 (FIG. 7) are coupled. The rotor 2066 also includes an outer surface 138 on which the eccentric mass 2030 is coupled. The eccentric mass 2030 only extends a partial distance around the circumference of the outer surface 138. Thus, a center of mass 2084 (FIG. 7) of the rotor 2066 is not intersected by a rotational axis 2086 of the rotor 2066, such that when the rotor 2066 rotates relative to the stator 2070, the rotor 2066 imparts vibration to the plate 38.

In any of the embodiments of FIGS. 3-7, the eccentric masses 30, 1030, 2030 can be an added component, such as a lead bar or plate. Alternatively, the eccentric masses 30, 1030, 2030 could be formed by eliminating material in a rotating component, such as forming a hole in the rotor, in which case no additional components would be added and the existing material of the rotor could be used as the eccentric mass. Thus, the electric motors 34, 1034, 2034 with integrated eccentric masses 30, 1030, 2030 of FIGS. 3-7 eliminate the need for additional components that would otherwise be necessary in a typical plate compactor including the vibration mechanism 10 of FIG. 1 driven by an electric motor or engine. Also, the form factor and size of the plate compactor 26 may be reduced by integrating the masses 30, 1030, 2030 into or onto the rotors 66, 1066, 2066 of the electric motors 34, 1034, 2034.

Although the invention has been described in detail with reference to certain preferred embodiments, variations and modifications exist within the scope and spirit of one or more independent aspects of the invention as described.

Various features of the invention are set forth in the following claims.

What is claimed is:

1. A compactor comprising:
a plate; and
an electric motor coupled to the plate and configured to impart vibration thereto, the electric motor including
a stator, and
a rotor including a rotor shaft and a rotor main body surrounding the rotor shaft, the rotor defining a rotational axis and having a center of mass that is not intersected by the rotational axis, wherein the rotor main body supports a plurality of permanent magnets, and wherein an eccentric mass is directly connected to the rotor main body,
wherein the rotor is positioned within the stator, and
wherein the plurality of permanent magnets is a plurality of surface-mounted permanent magnets.

2. The compactor of claim 1, further comprising a battery configured to provide electrical power to the electric motor.

3. The compactor of claim 2, wherein the battery is arranged on a platform that is vibrationally isolated from the plate by a plurality of vibration isolators.

4. The compactor of claim 3, wherein the platform is configured as a housing, and wherein control electronics are located within the housing such that the control electronics are also vibrationally isolated from the plate by the vibration isolators.

5. The compactor of claim 1, wherein the rotor includes a plurality of bores arranged in an annular formation about the rotational axis, and wherein at least one, but not all, of the bores are filled with respective weights to collectively define the eccentric mass offset from the rotational axis.

6. The compactor of claim 1, wherein the rotor main body includes an axial plate, wherein the plurality of permanent magnets is coupled to a first side of the axial plate, and wherein the eccentric mass is coupled to an opposite, second side of the axial plate for co-rotation therewith about the rotational axis.

7. An electric motor configured for use with a compactor, the electric motor comprising:
a motor housing;
a stator disposed within the motor housing; and
a rotor arranged within the stator and configured for rotation relative to the stator about a rotational axis, the rotor including
a plurality of surface-mounted permanent magnets, and
a plurality of bores arranged in an annular formation about the rotational axis,
wherein at least one, but not all, of the bores are filled with respective weights to collectively define an eccentric mass offset from the rotational axis.

8. The electric motor of claim 7, wherein the at least one weight is configured such that a center of mass of the rotor does not intersect a rotational axis of the rotor.

9. An electric motor configured for use with a plate compactor, the electric motor comprising:
a motor housing;
a stator;
a rotor configured for rotation relative to the stator about a rotational axis, the rotor including an axial plate and a plurality of permanent magnets; and an eccentric mass coupled to the axial plate for co-rotation with the rotor about the rotational axis,
wherein the permanent magnets are affixed to a first side of the axial plate, and wherein the eccentric mass is coupled to an opposite, second side of the axial plate.

10. The electric motor of claim 9, wherein the eccentric mass is offset from the rotational axis of the rotor.

\* \* \* \* \*